UNITED STATES PATENT OFFICE.

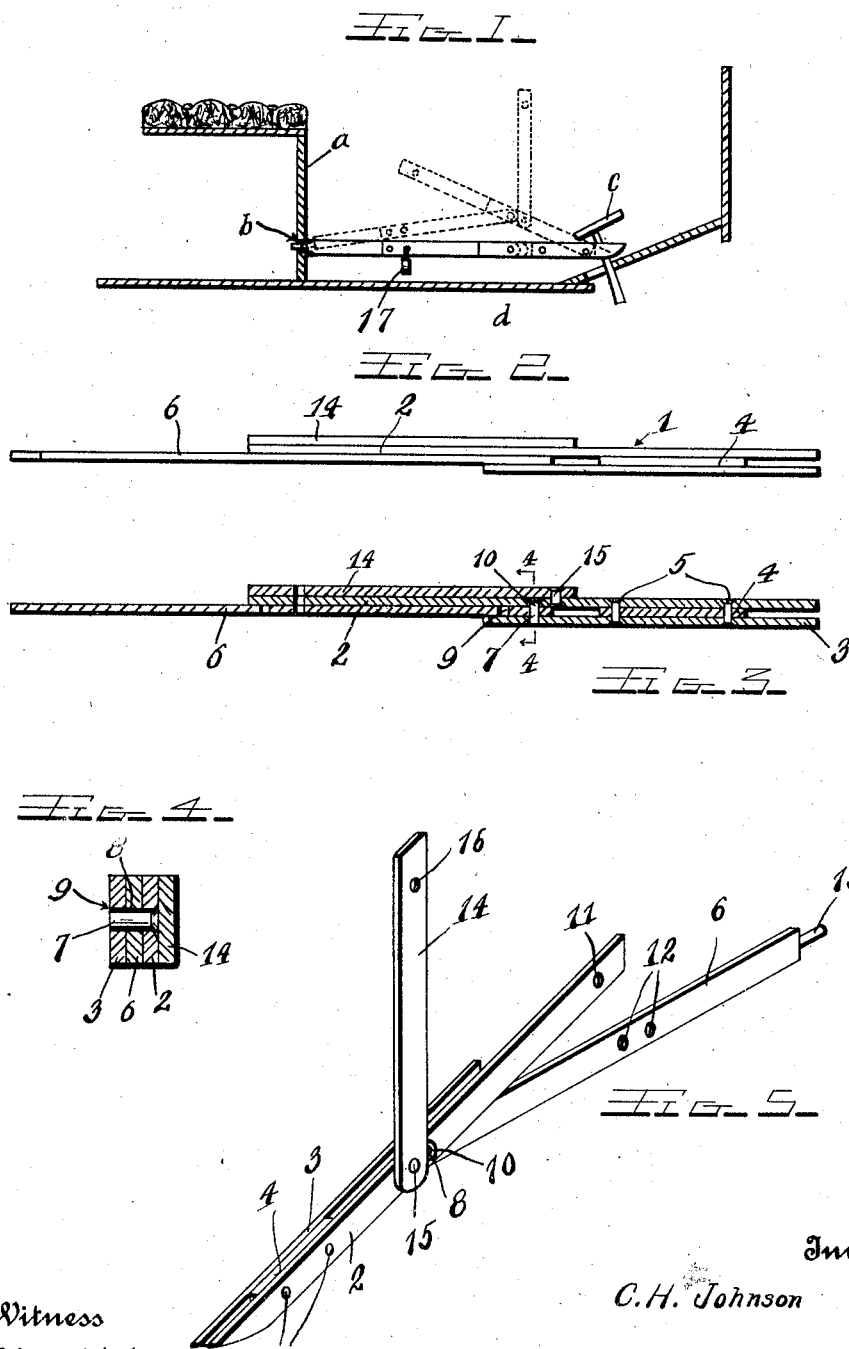

CALEB H. JOHNSON, OF BRIDGETON, NEW JERSEY.

MOTOR-VEHICLE LOCK.

1,360,534.  Specification of Letters Patent.  Patented Nov. 30, 1920.

Application filed August 18, 1919. Serial No. 318,362.

*To all whom it may concern:*

Be it known that I, CALEB H. JOHNSON, a citizen of the United States, residing at Bridgeton, in the county of Cumberland and State of New Jersey, have invented certain new and useful Improvements in Motor-Vehicle Locks; and I do declare the following to be a full, clear, and exact description of the invention, such as will enable others skilled in the art to which it appertains to make and use the same.

This invention relates generally to motor vehicle accessories, but more particularly to locking devices for motor vehicles.

The primary object of the invention is to provide a device to be attached to a motor vehicle for holding the clutch lever thereof in the released position, and thereby preventing the vehicle from being driven by unauthorized persons.

Another object of the invention is to provide a locking device of this character which is adjustable so that it can be used in connection with motor vehicles of various makes, types and sizes.

A further object of the invention is to generally improve upon devices of this nature by the provision of an extremely simple, strong, durable and inexpensive construction, and one which will be well adapted to the purpose for which it is designed.

With these and other objects in view the invention consists of certain novel features of construction, and the combination and arrangement of parts as will be hereinafter fully described and claimed.

In the accompanying drawings in which similar reference characters designate like parts throughout the several views:—

Figure 1 is a side elevation of the device, constructed in accordance with this invention showing it in locked position upon a motor vehicle;

Fig. 2 is an enlarged top or edge view of the device;

Fig. 3 is a longitudinal sectional view through the device;

Fig. 4 is a transverse sectional view taken on the plane indicated by the line 4—4 of Fig. 3; and Fig. 5 is a perspective view of the device.

Referring more particularly to the drawings, the numeral 1 designates as a whole a link which is preferably composed of a pair of spaced plates or bars 2 and 3 having disposed between their forward end portions a spacing strip or plate 4. The elements 5 which fasten the bars 2 and 3 and the strip 4 together extend through all three of these parts.

The extreme forward ends of the bars 2 and 3 which extend beyond the forward end of the strip 4 form a fork for straddling and effecting an engagement with the clutch lever of an automobile.

The bar 2 is considerably longer than the bar 3, and pivoted at one end of the two bars at a point located at substantially the middle portion of the bar 2 is another link 6. The pivot employed for connecting the link 6 to the link 1 is in the form of a headed pin or screw 7 which extends through alined apertures 8 in the bars 2 and 3 and one of a series of apertures 9 arranged in the link 6. The head of the pivoting element 7 is countersunk in a recess 10 arranged in the outer side of the bar 2. This pivoting element is removable so that it may be inserted through either one of the openings 9 arranged in the link 6 in order to obtain the desired length of the device when the links are extended in substantially longitudinal alinement.

The bar 2 is provided with an aperture 11 at its rear end and the link 6 is provided with a series of apertures 12 at its intermediate portion. These apertures 12 are spaced apart at a distance equal to the space between the apertures 9 and are the proper distance away from the latter so that when the extended inner end portion of the bar 2 is grasped and the links 1 and 6 are swung into longitudinal alinement the opening 11 in the bar 2 will register with one of the apertures 12 in the link 6 depending upon which of the apertures 9 at the other end of the latter the pivoting element 7 is extended through.

The rear or free end of the link 6 is provided with a means for engagement with a stationary part of an automobile in connection with which this device is to be used. This means preferably comprises a pin 13 which extends longitudinally from the link 6 and being formed by reducing this end of the latter in width.

In order to maintain the pivoting element 7 in place in the registering openings 8 and 9 in the links 1 and 6 respectively, a bar 14 is pivoted at one end by means of a non-removable element or pivot 15 to the bar 2 at a point disposed adjacent the aperture 8 in the same. This bar 14 is adapted to swing alongside of the bar 2 or in longitudinal alinement with the whole link 1, and it is provided at its other end with an aperture 16 adapted to register with the aperture 11 in the bar 2 when in this position with respect to the same.

In using the device the front side of the driver's seat support $a$ of an automobile must be provided with a suitable recess or opening $b$ to receive the pin 13 therein. This opening should preferably be disposed directly back of the clutch pedal $c$ of the automobile and at a distance from the floor of the latter corresponding substantially with the upwardly extent of the clutch pedal. After the pin 13 has been inserted in the opening $b$ and the lever portion or arm of the clutch pedal is engaged between the forward ends of the link 1 and the two links 1 and 6 are properly adjusted with respect to each other by means of extending the element 7 through the opening 9 in the link 6 so that when the two links are swung into substantially longitudinal alinement with each other they will move the clutch pedal to its foremost or released position, a locking means in the form of an ordinary padlock 17 is inserted through the alined openings 16, 11 and 12 of the bar 14, bar 2 and link 6 respectively. This obviously holds the clutch pedal in released position and unauthorized persons cannot drive the automobile. Furthermore, there is no way to remove the locking device except by unlocking the padlock 17 with an appropriate key and removing the same, and then swinging the links out of longitudinal alinement with each other to disconnect them from the parts of the machine which they engage.

From the foregoing description, taken in connection with the accompanying drawings, the construction, use and operation of the device will be readily understood without a more extended explanation.

Various changes in form, proportion, and in the minor details of construction may be resorted to without departing from the spirit of the invention as set forth in the claims.

What is claimed is:

1. A device of the class described comprising a pair of pivotally connected links capable of being swung substantially in longitudinal alinement, and varying the length of the structure formed by said links when longitudinally alined, means carried by one link for fitting into a socket of a stationary part of a motor vehicle, and means at the free end portion of the other link for engagement with the clutch lever of the vehicle when the links are extended.

2. A device of the class described comprising a link having an aperture in its intermediate portion and an aperture in one end, a second link having a series of apertures in one end and a series of apertures in its intermediate portion, a removable headed pin extending through the first mentioned aperture of the first link and one of the apertures in the first mentioned series of the second link to pivotally connect said links together, and permitting them to swing into substantially longitudinal alinement, said pin being inserted from the side of the first link, a bar pivoted at one end to the first link and having an aperture in its other end adapted to register with the last mentioned aperture of the first link and one of the apertures of the last mentioned series of the second link, said bar being disposed over the head of said pin when alongside of the first link to maintain said pin in place, means extending through the aperture in said bar, the last mentioned aperture in the first link and the alined aperture of the last mentioned series of the second link to lock said links in their longitudinally alined positions, means carried by one link for engagement with a stationary part of a motor vehicle, and means carried by the other link for engagement with the clutch lever of the vehicle.

3. A device of the class described comprising a link composed of a pair of spaced parallel bars adapted to straddle at one end the clutch lever of a motor vehicle, one bar having a countersunk aperture in its intermediate portion and an aperture in its other end, a second link having a series of apertures in one end and another series of apertures in its intermediate portion, said second link having its apertured end disposed between said bars with one of the apertures of its first mentioned series registered with the countersunk aperture in the respective bar, a headed pin extending through these registering apertures and having its head disposed in the countersink of the one in the bar, an additional bar pivoted at one end to the last mentioned bar and having an aperture in its other end adapted to register with the last mentioned aperture of this bar and one of the apertures of the last mentioned series of said link, said additional bar bearing against the head of said pin to prevent the removal of the same, a padlock extending through the aperture in said additional bar, the last mentioned aperture in the last mentioned bar of the first link, and the registering aperture of the last mentioned series of said link, and a pin extending longitudinally from the other end of said link for engagement with a stationary part of the motor vehicle.

4. The combination with a motor vehicle, of a pair of pivotally connected links capable of being moved longitudinally and disposed substantially in longitudinal alinement, the outer end of one link being provided with a fork for straddling the clutch lever of the vehicle to hold said lever in a released position, a stationary part of the vehicle having an opening therein, a pin extending from the outer end of the other link and disposed in said opening, and means for locking said links in their longitudinally alined positions.

5. The combination with a motor vehicle, of a pair of pivotally connected links capable of being moved longitudinally and disposed in longitudinal alinement, the outer end of one link having a pin extension for snugly fitting into an opening formed in a stationary part of the vehicle and the outer end of the other link engaging the clutch lever thereof to hold the latter in released position, means for locking said links in their longitudinally alined positions, and means for varying the length of the structure formed by said links when alined longitudinally.

In testimony whereof I have hereunto set my hand.

CALEB H. JOHNSON.